United States Patent [19]
Arent

[11] Patent Number: 6,018,724
[45] Date of Patent: Jan. 25, 2000

[54] METHOD AND APPARATUS FOR AUTHENTICATING ON-LINE TRANSACTION DATA

[75] Inventor: Michael A. Arent, Albany, Calif.

[73] Assignee: Sun Micorsystems, Inc., Palo Alto, Calif.

[21] Appl. No.: 08/885,055

[22] Filed: Jun. 30, 1997

[51] Int. Cl.[7] .................................................. G06F 19/00
[52] U.S. Cl. ............................................... 705/44; 705/39
[58] Field of Search ....................... 705/44, 39; 395/186; 380/23

[56] References Cited

U.S. PATENT DOCUMENTS

| | | | |
|---|---|---|---|
| 5,659,616 | 8/1997 | Sudia ........................................ | 380/23 |
| 5,796,841 | 8/1998 | Cordery et al. ........................... | 380/55 |
| 5,815,657 | 9/1998 | Williams et al. ........................ | 395/186 |
| 5,826,245 | 10/1998 | Sandberg-Diment ..................... | 705/44 |

Primary Examiner—Allen R. MacDonald
Assistant Examiner—Penny Caudle
Attorney, Agent, or Firm—Hecker & Harriman

[57] ABSTRACT

The present invention comprises a method and apparatus for authenticating data related to on-line transactions. The invention utilizes a user-customized certification indicator that informs a user as to the success or failure of one or more authentication and/or security protocols implemented on a user communications access device such as a personal computer, a personal digital assistant ("PDA"), an enhanced function telephone, etc. In one or more embodiments, one of the components of the indicator is user defined, and locally stored, reducing the likelihood of interception and counterfeiting. In one or more embodiments, the indicator components include a centrally provided graphic element and a user defined text overlay. When a user initiates an electronic transaction, a background validation process is initiated that implements procedures for determining the authenticity of data related to the transaction, such as the identity of a transaction party. If the validation process determines that the data is authentic, the validation process displays a certification indicator comprising the graphic overlaid with the user defined text-string. In another embodiment, the certification indicator includes one or more multi-media components, such as, for example, an audio component.

8 Claims, 10 Drawing Sheets

METHOD AND APPARATUS FOR AUTHENTICATING ON-LINE TRANSACTION DATA

BACKGROUND OF THE INVENTION

1. Field of the Invention

The present invention relates to electronic commerce, and more particularly to a method and apparatus for authenticating and verifying data related to electronic transactions.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Electronic commerce via distributed network environments such as the internet and intranets has the potential for replacing many forms of traditional commerce. One factor impeding the growth of electronic commerce is a concern over the security of transactions conducted via the internet. This concern stems in part from the difficulty of providing verification and accountability via the internet. It is easy for legitimate and illegitimate businesses alike to set up web sites to solicit business over the internet. Accordingly, there is a degree of uncertainty about the identity and legitimacy of any business offering goods or services via an internet web page and about the authenticity of data related to on-line transactions. Customers are wary about purchasing goods or services and sending confidential information such as credit card numbers to internet based businesses without a degree of certainty as to the authenticity and legitimacy of an internet merchant.

SUMMARY OF THE INVENTION

The present invention comprises a method and apparatus for authenticating and verifying data related to electronic transactions and for providing positive confirmation to a user of such authentication and verification. In one embodiment, such data includes the contents of an electronic "wallet," including identity and other data from a transaction party, electronic payment instrument data, security protocol data, and wallet operation data. The invention utilizes a user-customized certification indicator that informs a user as to the success or failure of one or more authentication and/or security protocols implemented on a user communications access device such as a personal computer, a network computer ("NC"), a personal digital assistant ("PDA"), an enhanced function telephone, etc. In one or more embodiments, the certification indicator includes multiple components. One of the components of the indicator is user defined, and locally stored, reducing the likelihood of interception and counterfeiting. In one or more embodiments, the indicator components include a centrally provided graphic element and a user defined text overlay. In one embodiment, the centrally provided graphic element is a graphic image, for example an image of an official seal, supplied by a trusted certification authority that provides transaction party certification services. The user defined text overlay is a user defined text string, similar to a user defined password. When a user initiates an electronic transaction with a transaction party, a background validation process is initiated that implements procedures for determining the authenticity of the transaction party as well as of other data related to the transaction. In one embodiment, such transaction data includes data received by and displayed (for example using a "wallet" interface) by the user's communications access device. If the validation process determines that the data is authentic, the validation process displays a certification indicator comprising the graphic of the official seal overlaid with the user defined text-string. In another embodiment, the certification indicator includes one or more multi-media components, such as, for example, an audio component.

DETAILED DESCRIPTION OF THE INVENTION

A method and apparatus for authenticating data related to on-line transactions is described. In the following description, numerous specific details are set forth in order to provide a more thorough description of the invention. It will be apparent, however, to one skilled in the art that the invention may be practiced without these specific details. In other instances, well-known features have not been described in detail so as not to obscure the invention.

Figure 1:
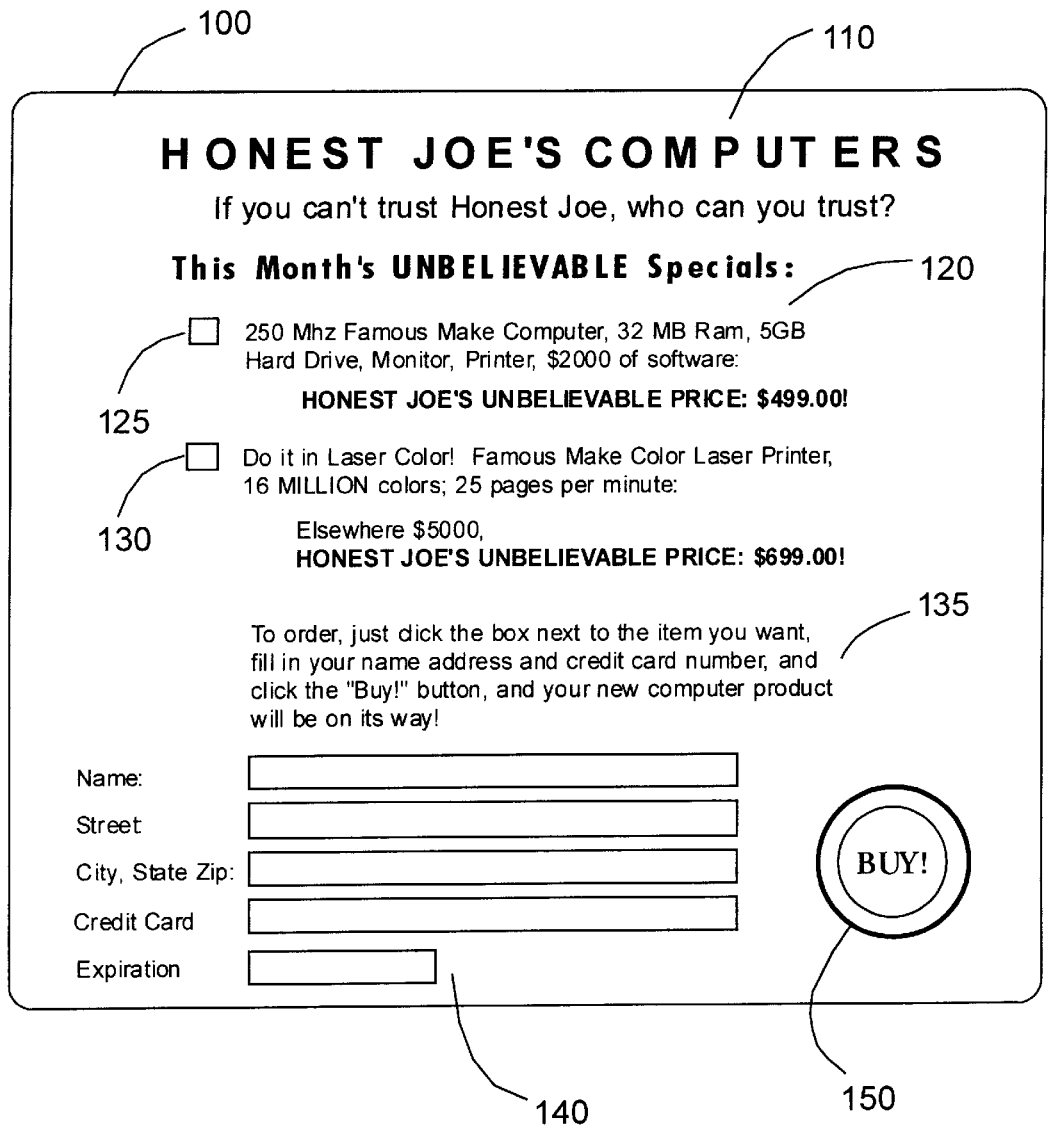
FIG. 1 shows an example of an on-line merchant's web page.

FIG. 1 shows an example of a web page 100 of an internet merchant that offers items for sale via the internet. Web page 100 may, for example, be an HTML page, and may include functionality provided by Java applets, as is well known in the art.

In the example of FIG. 1, web page 100 contains a merchant's name 110, a list of items for sale 120, check boxes 125 and 130, purchasing instructions 135, a customer information entry area 140, and a "buy" button 150. According to purchasing instructions 135, to purchase one of the items listed in list 120, a user clicks the check box next to the item desired, fills in the user's name, address and credit card information in customer information entry area 140, and clicks on button 150. In the example of FIG. 1 these payment mechanisms are provided by the web page and the user's web browser. In other embodiments, payment mechanisms may be provided in a different manner, for example by an electronic "wallet" application program or applet.

A user browsing a merchant's web page such as web page 100 may be interested in purchasing one or more items being offered for sale on the web page, but may have concerns about buying from an on-line merchant whose identity and business practices are unknown to the user and with whom the user has had no previous experience.

One way to alleviate the user's concerns is for an entity trusted by the user to certify the legitimacy of the merchant. The trusted entity may be a certification authority that evaluates and certifies merchants that meet the certification authority's certification criteria, for example, by issuing digital certificates to certified merchants or by including the merchant in a database of certified merchants maintained by the certification authority.

To check the authenticity of a particular on-line merchant, the computer or other communications access device used by the user (for example a personal digital assistant (PDA), a network computer, an internet television access device such as "WebTV" (tm), an enhanced cellular telephone, etc.) is provided with computer processor readable program instructions for determining whether a merchant has been certified by a trusted certification authority and for verifying the identity of the merchant and other data related to the transaction. The instructions may, for example, form part of an internet browser application, or may be part of a separate application program, such as an electronic "wallet," that may be used in conjunction with an internet browser.

Figure 2:
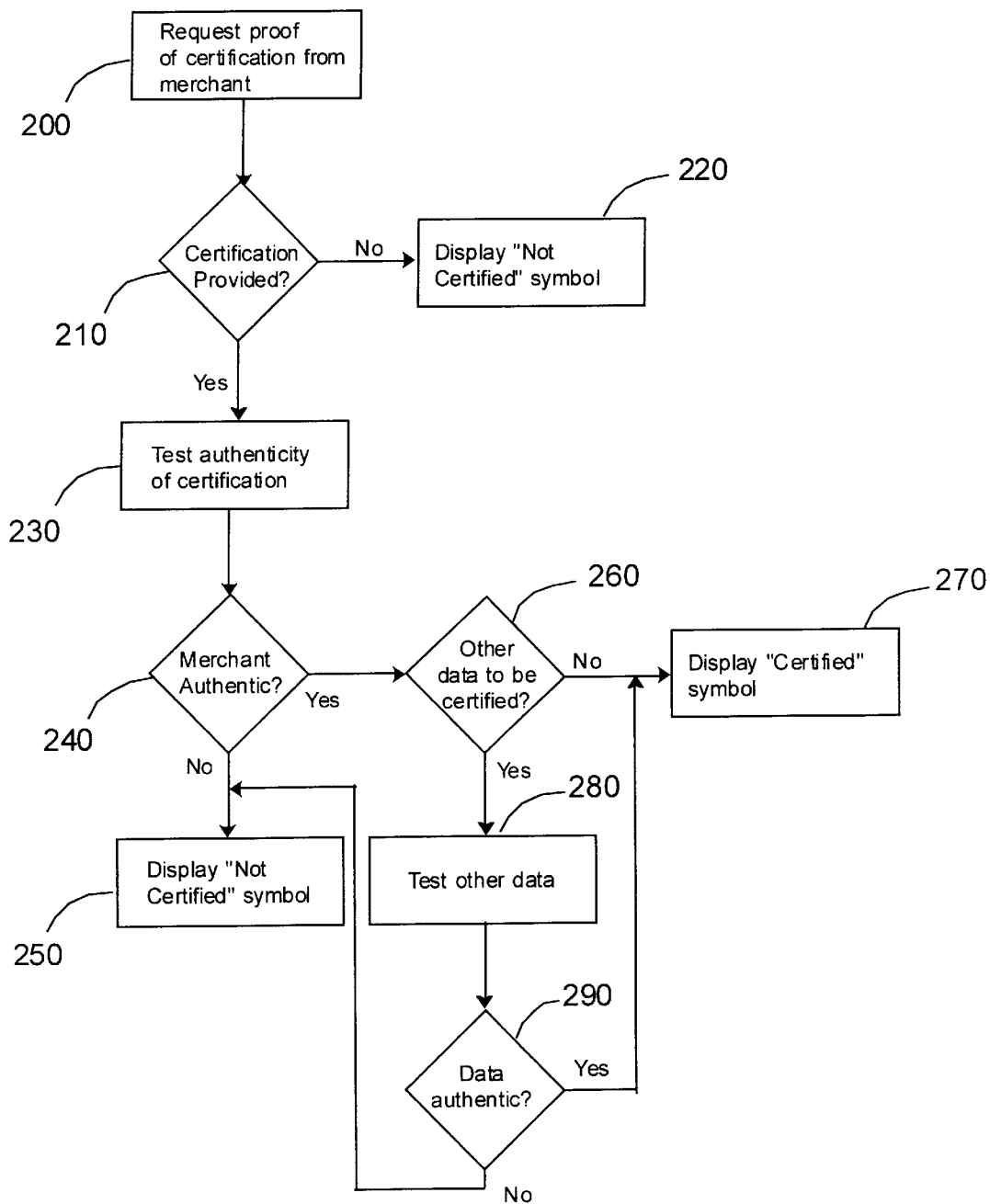
FIG. 2 is a flow chart of a method that may be used by a user's communications access device to authenticate an on-line-merchant.
Figure 3:
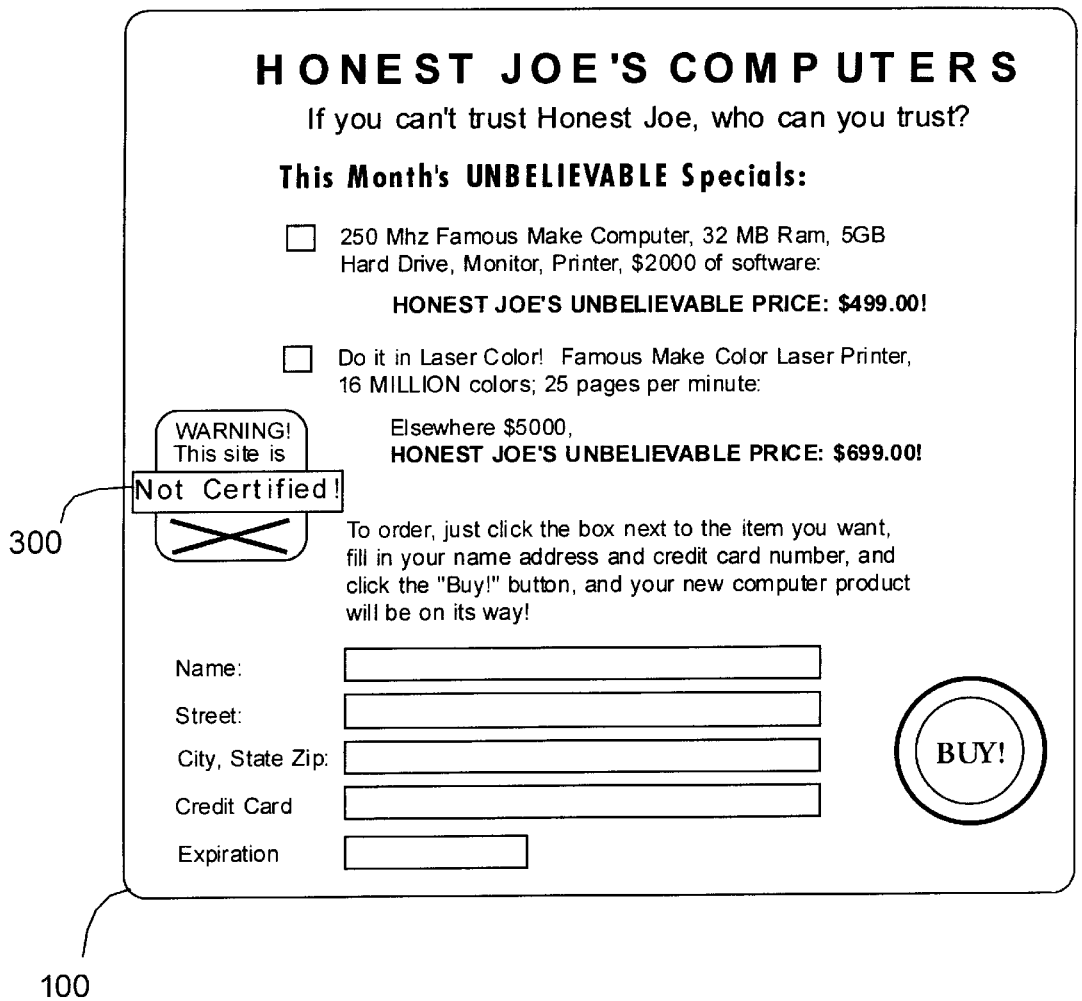
FIG. 3 shows an example of a certification indicator indicating an absence of certification displayed on a user's communications access device.

FIG. 2 is a block diagram of a method that may be used by a user's communications access device to authenticate an on-line-merchant. As shown in FIG. 2, the user's communications access device sends a request for proof of certification to the merchant at step 200. The sending of the request may be initiated as part of some other transaction (e.g. requesting an invoice) or may be initiated through an express user action. The requested proof of certification may have any of a variety of forms as are known in the art. For example, the proof of certification may comprise a digitally signed message or a copy of a digital certificate from a trusted certification authority. At step 210, a determination is made as to whether a requested proof of certification was provided by the merchant in response to the user's request. If no proof of certification was provided by the merchant, the user's access device displays a certification indicator that indicates an absence of certification to the user. An example of a certification indicator that indicates an absence of certification is indicator 300 of FIG. 3. In the example of FIG. 3, certification indicator 300 is displayed by the user's access device as a graphic that floats above merchant web page 100. In other embodiments, certification indicator 300 may be displayed elsewhere, such as in the interface of another application program or applet. For example, in one embodiment certification indicator 300 is displayed in an electronic "wallet" interface.

If it is determined at step 210 that the merchant did supply a proof of certification in response to the user's request at block 200, the authenticity of the certification is tested at step 230, using an appropriate testing process for the form of proof of certification provided by the merchant. For example, if the proof of certification is a digital signature, the user's device may obtain a copy of the merchant's public key from a trusted party, and use the key to test the merchant's digital signature.

At step 240, a determination is made as to whether the test of the merchant's proof of certification has authenticated the merchant. If the merchant is not authenticated, a certification indicator indicating an absence of certification, such as indicator 300 of FIG. 3, is displayed to the user at step 250. The certification indicator may be displayed as a graphic that floats over the merchants web page as shown in FIG. 3, or may be displayed in some other manner, for example in an electronic "wallet" interface.

Figure 4:
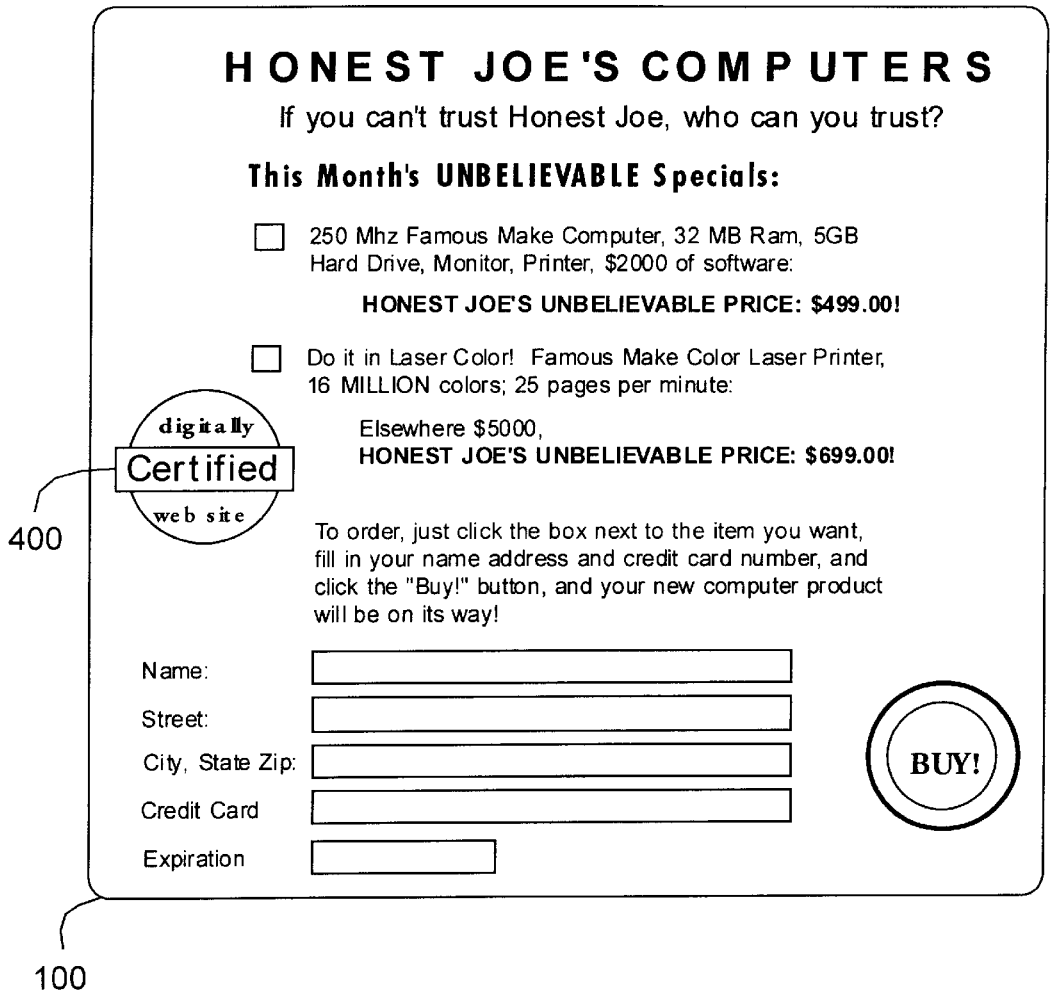
FIG. 4 shows an example a certification indicator displayed on a user's communications access device.

If it is determined that the merchant is authentic, a determination is made at step 260 as to whether any other data related to the transaction needs to be certified. Such other data may include, for example, the contents of an electronic "wallet" that is being displayed, such as electronic payment instruments displayed in the wallet. Data to be certified may also include, without limitation, security protocols and electronic payment or transfer operations. If there is no additional data to be certified, a certification indicator indicating successful certification is displayed to the user at step 270. An example of a certification indicator that indicates successful certification is symbol 400 of FIG. 4. In the example of FIG. 4, certification indicator 400 is displayed by the user's access device as a graphic that floats above merchant web page 100. Alternatively, certification indicator 400 may be displayed elsewhere, such as in the interface of another application program or applet, for example an electronic "wallet" applet or application program.

If there is additional data to be certified, such data is tested at step 280, and a determination as to the data's authenticity is made at step 290. If the data is not authenticated, a certification indicator indicating an absence of certification is displayed to the user at step 250. If the data is authenticated, a certification indicator confirming authentication is displayed to the user at step 270.

In the embodiment of FIG. 4, certification indicator 400 is a standard symbol supplied as part of the program code that performs the authentication process of FIG. 2. One drawback of using a standard certification indicator such as symbol 400 of FIG. 4 is that an unscrupulous merchant could make a copy of the certification indicator and cause it to be displayed on the user's access device to make it appear that the user's device has successfully authenticated the the transaction data, even when the user's access device has found the data to be not certified.

To prevent unauthorized counterfeiting of a certification indicator, one or more embodiments of the invention use a certification indicator that comprises a component that has been customized by the user. This user defined component is stored in a secure form in a local storage device of the user's internet access device. Since the user defined component is not predictable and is available only on the user's local access device, it cannot be easily copied and forged by an unscrupulous merchant.

Figure 5:
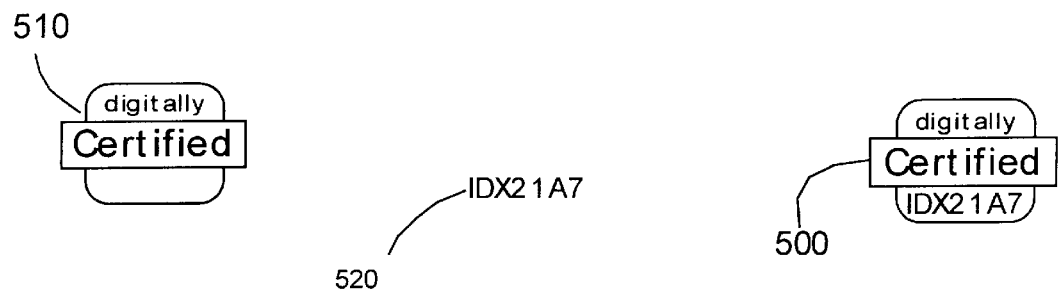
FIG. 5 shows an example of a multi-component certification indicator.

One embodiment of a certification indicator of the invention comprising a user defined component is shown in FIG. 5. In this embodiment, certification indicator 500 is a multi-component indicator that consists of a standard component 510 and a user defined component 520. In the example of FIG. 5, standard component 510 comprises a graphic symbol supplied, for example, by the supplier of the user's merchant authentication computer code. In this embodiment, user defined component 520 consists of a text string, similar to a password, selected by the user. The text string may be selected, for example, during a setup phase of the user's merchant authentication software. The text string may include any kind of text in any machine readable format, including ASCII, Unicode, etc.

Figure 6:
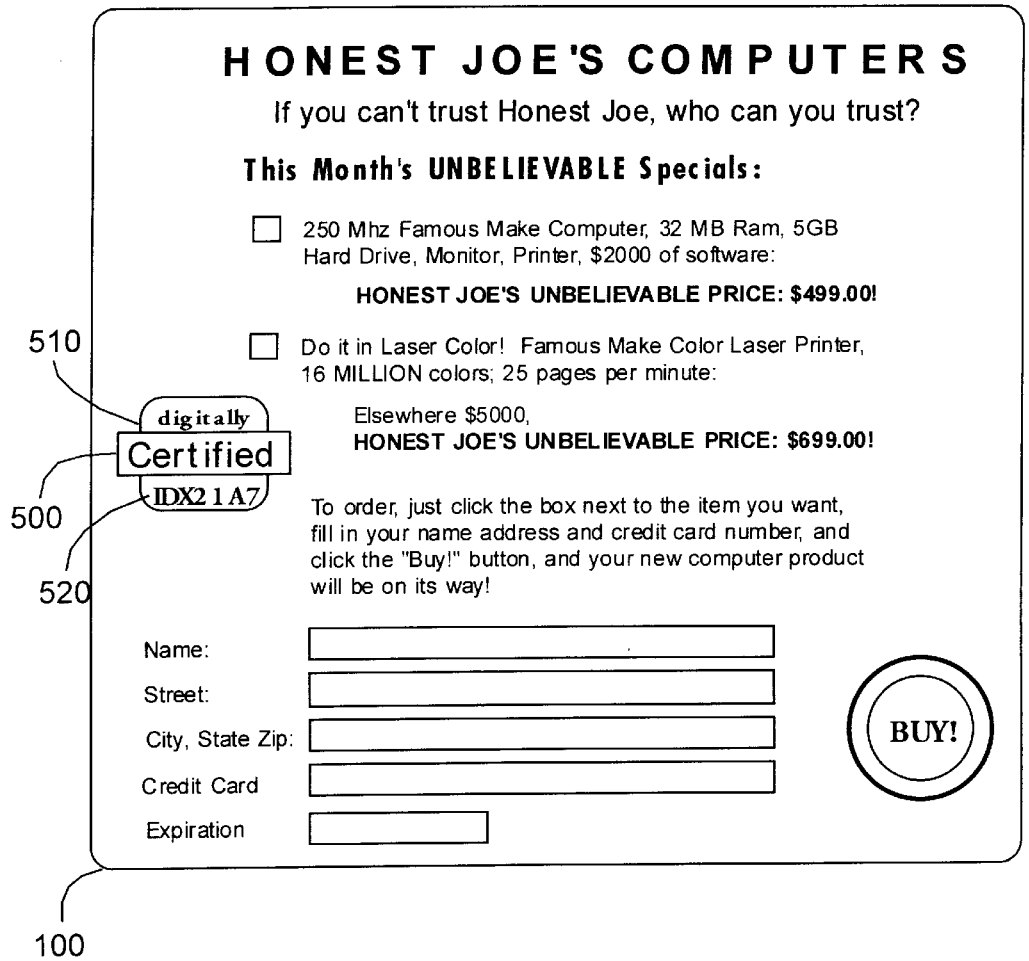
FIG. 6 shows an example of a multi-component certification indicator displayed on a user's communications access device.

Standard component 510 and user defined component 520 are stored in separate locations on the user's computer or other communications access device. In the embodiment of FIG. 5, they are retrieved and combined to form certification indicator 500 only after a particular merchant or other transaction party has been authenticated. For example, in the embodiment of FIG. 2, components 510 and 520 are retrieved from storage and combined as part of step 270. FIG. 6 shows combined certification indicator 510 displayed on top of merchant web page 100. Alternatively, certification indicator 510 may be displayed elsewhere, such as in the interface of another application program or applet, for example an electronic "wallet" applet or application program.

In the embodiment of FIG. 5, the certification indicator comprises two components: a standard graphic component and a user-defined text string. The certification indicator may, however, have any of a variety of other structures, provided that some aspect of the indicator is user defined so that the indicator cannot easily be forged.

Figure 7:
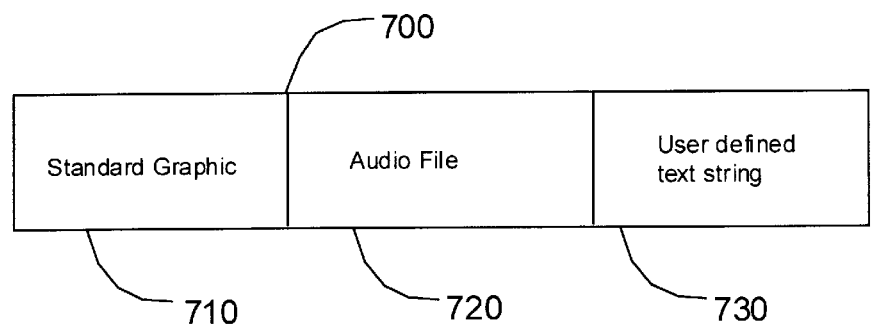
FIG. 7 is a block diagram of a certification indicator comprising a sequence of multi-media components.

The term "indicator" as used with respect to the invention includes static indicators as well as dynamic, multi-media indicators. FIG. 7 is a block diagram of an embodiment of a certification indicator of the invention that comprises a sequence of one or more media items such as graphics, text, sound, animation, and video. In the embodiment shown in FIG. 7, certification indicator 700 comprises a sequence of three media items: a standard graphic 710, an audio segment 720, and a user-defined text string 730. In this embodiment, when the certification indicator is to be displayed to the user (as, for example, at step 250 of FIG. 2), the indicator is presented to the user in a sequential manner. First, standard graphic 710 is displayed. Next, audio segment 720 is played. Finally, user-defined text string 730 is superimposed on standard graphic 710. It will be apparent to those skilled in the art that media items of a certification indicator can be presented in any desired order, and that more than one media item may be presented simultaneously.

Preferably, certification indicator 700 comprises at least one user defined component. Such a user-defined component may constitute a user-defined media item (such as, for example, user defined text string 730), or a user-defined order for presentation of different media components, or a user defined selection of media items from a pool of supplied standard media items.

Figure 8:
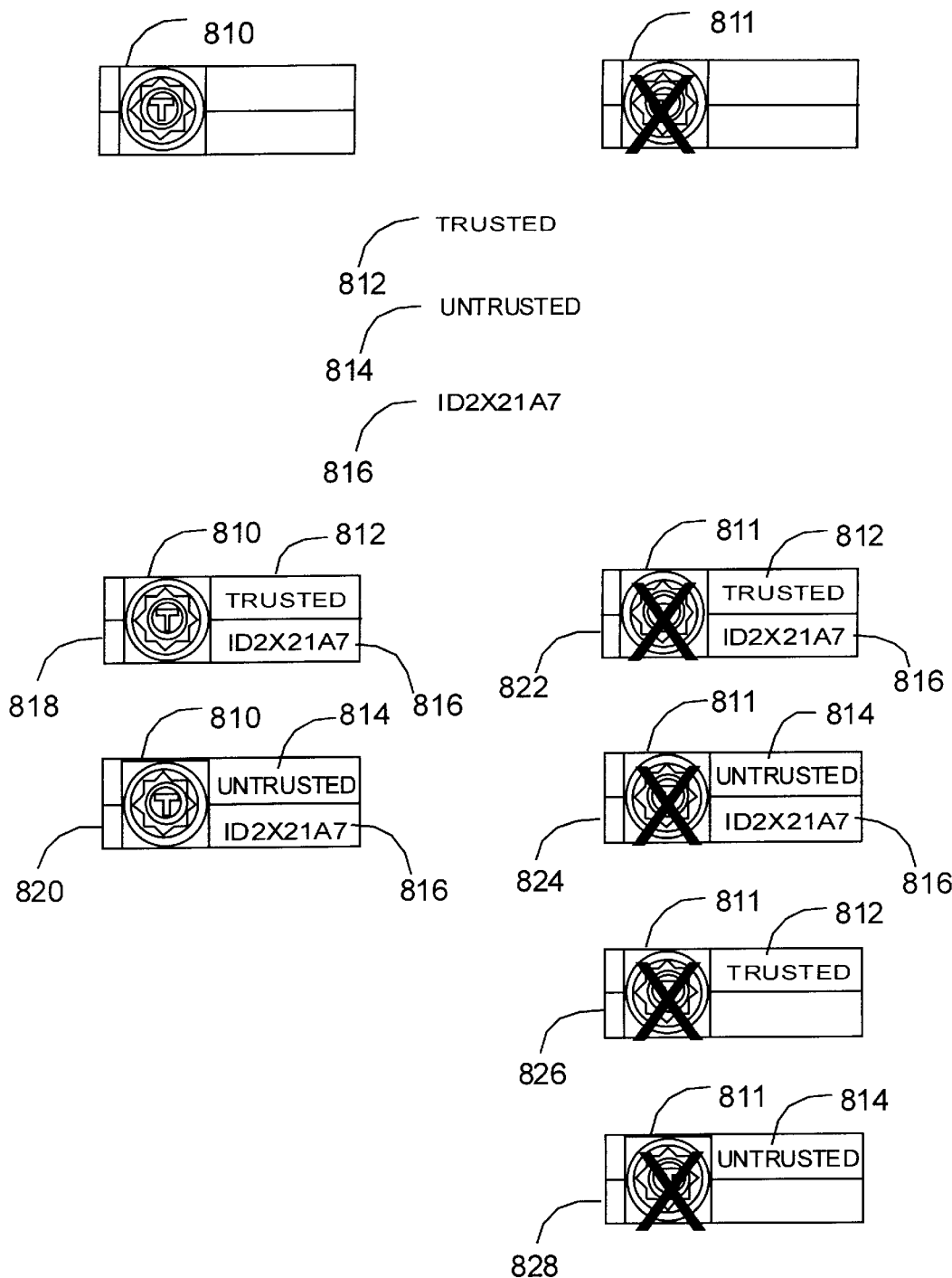
FIG. 8 shows examples of multi-component certification indicators.
Figure 11:
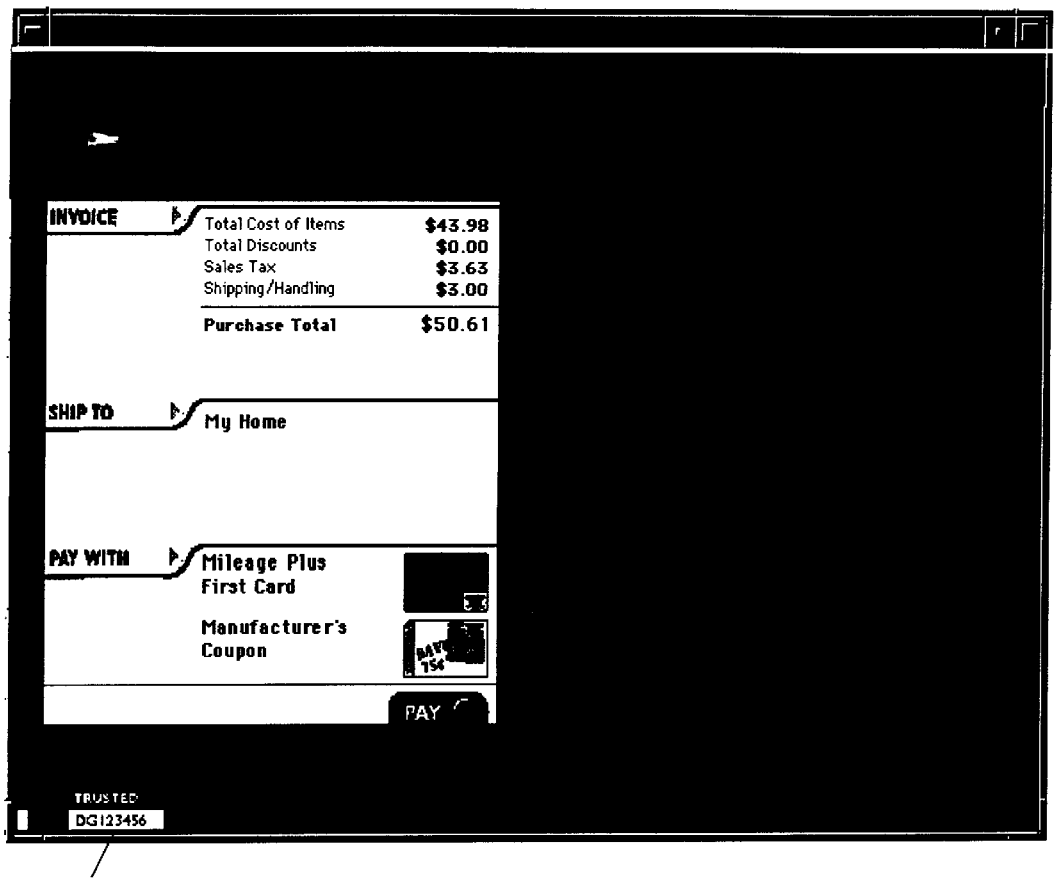
FIG. 11 shows an example of a Java Wallet in which a certification indicator is displayed.

FIGS. 8 shows embodiments of certification indicators that may be used in conjunction with the Java Wallet (TM), a user interface for the Java Electronic Commerce Framework (TM) ("JECF") from JavaSoft. JECF includes a client-side software architecture for secure electronic commerce and sensitive data transactions. The Java Wallet (TM) is a user interface for JECF that provides interaction controls and user input and display areas that allow on-line purchases, value transfers and administrative functions. When activated for use, the Wallet is displayed independently on a user's communications access device on top of other applications, such as, for example, World Wide Web browsers or operating environments such as the various implementations of Windows from Microsoft. A description of the Java Wallet (TM) user interface is attached as Appendix A. FIG. 11 shows an example of a Java Wallet 1100 in which a certification indicator 1110 is displayed. A description of the procedure used to display indicator 1110 in Java Wallet 1100 is attached as Appendix B.

A Java Wallet, in conjunction with JECF, includes computer program instructions for performing authentication tests on web site proprietors and on other on-line transaction parties, and for authenticating data related to on-line transactions. These instructions have the ability to determine whether or not a transaction party is authentic (i.e. is who the party says the party is). The instructions also have the ability to determine whether or not an offer presented to a user (e.g. via a web site) has been digitally signed by the party making the offer, as well as whether or not other information displayed to the user by the Wallet is authentic. These determinations are made by the Wallet and JECF transparently to the user. The possible results of these determinations include the following:

1. The transaction party and/or other transaction data is authentic and the offer is signed.

2. The transaction party and/or other transaction data is authentic and the offer is unsigned.

3. The transaction party and/or other transaction data is not authentic (or not recognized) and the offer is signed.

4. The transaction party and/or other transaction data is not authentic (or not recognized) and the offer is unsigned. These results are displayed to the user using certification indicators such as the indicators shown in FIG. 8.

FIG. 8 shows components 810, 812, 814, and 816 that are assembled, as appropriate, into certification indicators 818 and 820. Components 810 and 811 are standard graphic components which may, for example, be supplied to the user as part of the Java Wallet code. Components 812 and 814 are standard text strings comprising the words "TRUSTED" and "UNTRUSTED," respectively. Like standard graphic components 810 and 811, standard text string components 812 and 814 may be supplied to the user as part of the Java Wallet Code. Component 816 is a user defined text string which may, for example, be generated during a setup procedure for the Java Wallet.

Certification indicator 818 is displayed to the user in situation number 1 listed above: when the transaction party and/or other transaction data is authentic and the offer from the transaction party is signed. At the time of display, certification indicator 818 is assembled from components 810, 812 and 816, as shown in FIG. 8.

Certification indicator 820 is displayed to the user in situation number 2 listed above: when the transaction party and/or other transaction data is authentic and the offer from the transaction party is unsigned. At the time of display, certification indicator 820 is assembled from components 810, 814 and 816, as shown in FIG. 8.

Certification indicator 822 is displayed to the user in situation number 3 listed above: when the transaction party and/or other transaction data is not authentic (or is not recognized) and the offer from the transaction party is signed. At the time of display, certification indicator 822 is assembled from components 811, 812 and 816, as shown in FIG. 8.

Certification indicator 824 is displayed to the user in situation number 4 listed above: when the transaction party and/or other transaction data is not authentic (or is not recognized) and the offer from the transaction party is unsigned. At the time of display, certification indicator 824 is assembled from components 811, 814 and 816, as shown in FIG. 8.

Certification indicators 826 and 828 are versions of certification indicators 822 and 824, respectively, that do not include component 816. Certification indicators 826 and 828 are used in certain embodiments instead of indicators 822 and 824, respectively.

In one or more embodiments, indicators 818, 820, 822, 824, 826 or 828, as applicable, are displayed as part of the user's Java Wallet interface when the user initiates use of the Java Wallet with respect to an on-line transaction. For example, while browsing the internet, a user may happen upon a web site with which the user wants to transact business. The user calls up the user's Java Wallet by activating an appropriate icon displayed, for example, by the user's browser or on the web site's web page. As the Java Wallet program code is being activated, authentication messages are sent from the user's device to the web site, and the responses received, if any, are evaluated according to the Wallet's authorization protocols to determine the authenticity of the web site. Depending on the result, the appropriate certification indicator is displayed as part of the Wallet interface.

In one or more embodiments, the certification indicators of FIG. 8, like the indicator shown in FIG. 7, include additional media components such as, for example, sound, video and animation.

In the embodiment of FIG. 8, the user-defined component 816 is defined by the user as part of the initial setup of the user's Java Wallet interface. A flow chart for a portion of the Java Wallet setup process used to generate the user-defined text string is shown in FIG. 9.

Figure 9:
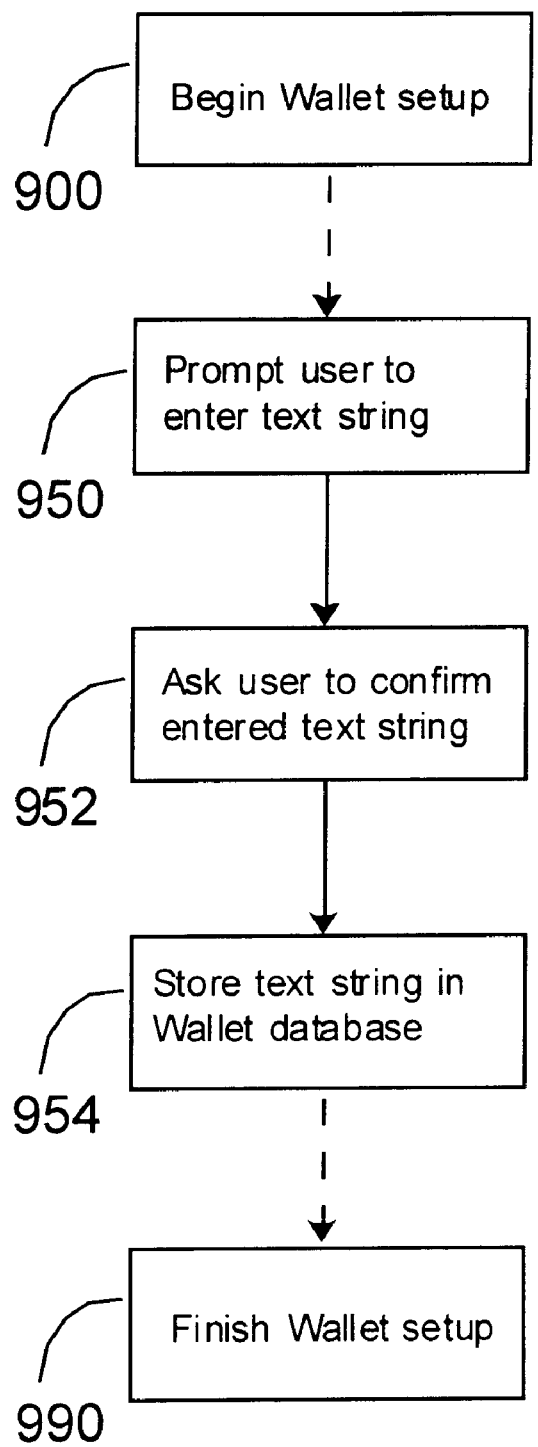
FIG. 9 is a flow chart of a method for generating a user-defined component of a certification indicator.

As shown in FIG. 9, the Wallet setup process begins at step 900. The setup process may, for example, be invoked the first time the user starts the Wallet process. During the Wallet setup process, the user is asked to select user preferences and enter user information. The dotted arrow in FIG. 9 between step 900 and 950 indicates that additional steps not directly related to the certification indicator may occur in between these steps. At step 950, the user is prompted to enter a text string to be used as the user-defined component of the user's certification indicator. In one embodiment, the user is prompted to enter an eight digit alphanumeric text string. After the user has entered the text string, the user is asked to confirm the text string at step 952. After the user has confirmed the user's choice of text string, the text string is stored at step 954 in a Wallet database containing Wallet related information. The Wallet setup process ends at step 990.

The Wallet database is stored in a secure manner on local storage of the user's computer or other communications access device. In one or more embodiments, the user defined component is stored separately from standard components (such as, for example, components 810 and 811).

Figure 10:
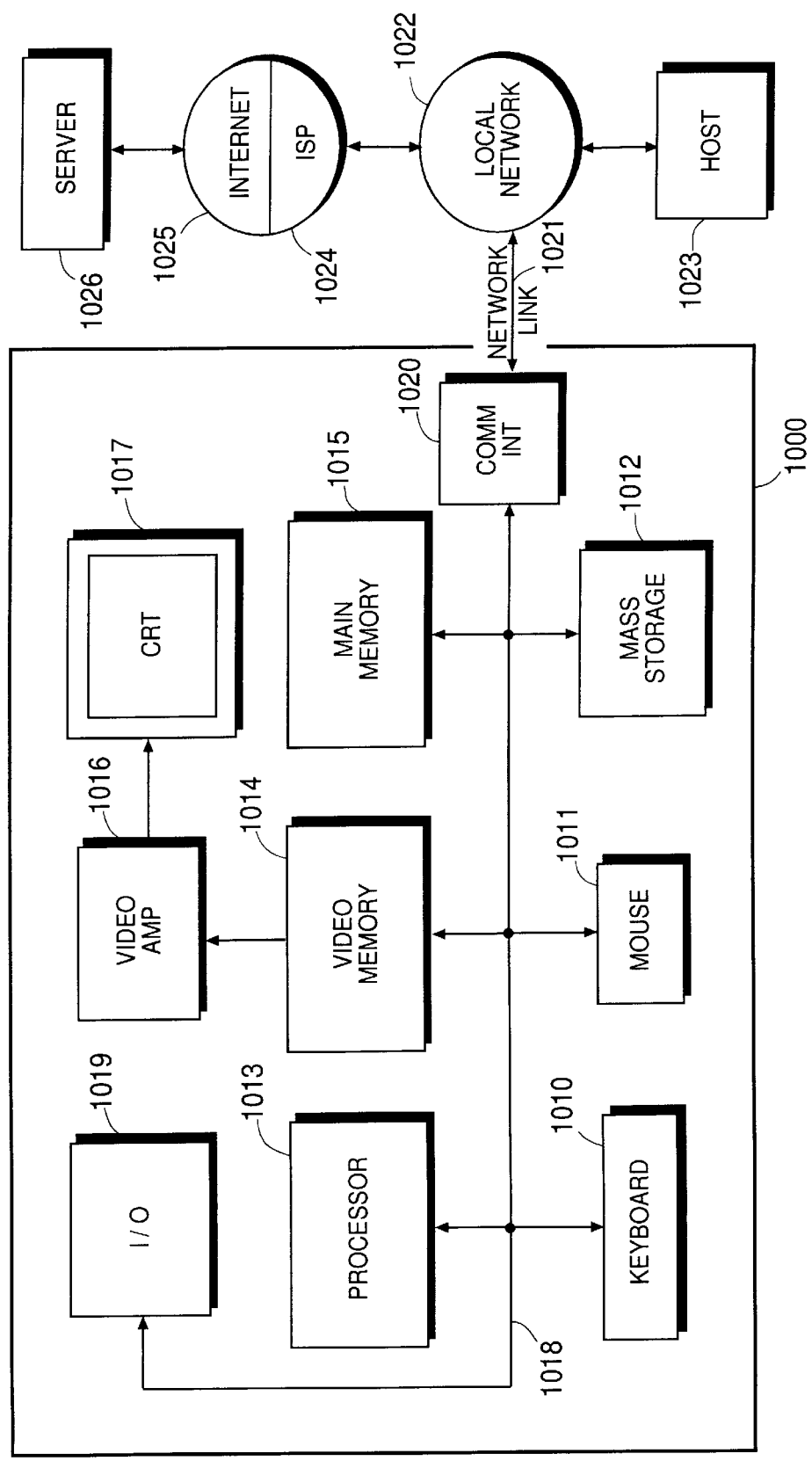
FIG. 10 is a schematic showing an example of a communications access device that may be used with one or more embodiments of the invention.

An example of a communications access device with which one or more embodiments of the invention may be used is shown in FIG. 10. The access device of FIG. 10 is a personal computer. However, the access device can comprise any of a variety of other devices, including, without limitation, personal digital assistants, network computers, enhanced cellular and hard-wired telephones, internet-capable television sets, etc.

An embodiment of the invention can be implemented as computer software in the form of computer readable program code executed on a general purpose computer such as computer 1000 illustrated in FIG. 10. A keyboard 1010 and mouse 1011 are coupled to a bi-directional system bus 1018. The keyboard and mouse are for introducing user input to the computer system and communicating that user input to central processing unit (CPU) 1013. Other suitable input devices may be used in addition to, or in place of, the mouse 1011 and keyboard 1010. I/O (input/output) unit 1019 coupled to bi-directional system bus 1018 represents such I/O elements as a printer, A/V (audio/video) I/O, etc.

Computer 1000 includes a video memory 1014, main memory 1015 and mass storage 1012, all coupled to bi-directional system bus 1018 along with keyboard 1010, mouse 1011 and CPU 1013. The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as CPU 1013, main memory 1015, video memory 1014 and mass storage 1012. Alternatively, multiplex data/address lines may be used instead of separate data and address lines.

In one embodiment of the invention, the CPU 1013 is a microprocessor manufactured by Motorola, such as the 680X0 processor or a microprocessor manufactured by Intel, such as the 80X86, or Pentium processor, or a SPARC microprocessor from Sun Microsystems. However, any other suitable microprocessor or microcomputer may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the cathode ray tube (CRT) raster monitor 1017. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1000 may also include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to host computer 1023 or to data equipment operated by an Internet Service Provider (ISP) 1024. ISP 1024 in turn provides data communication services through the world wide packet data communication network now commonly referred to as the "Internet" 1025. Local network 1022 and Internet 1025 both use electrical, electromagnetic or optical signals which carry digital data streams. The signals through the various networks and the signals on network link 1021 and through communication interface 1020, which carry the digital data to and from computer 1000, are exemplary forms of carrier waves transporting the information.

Computer 1000 can send messages and receive data, including program code, through the network(s), network link 1021, and communication interface 1020. In the Internet example, server 1026 might transmit a requested code for an application program through Internet 1025, ISP 1024, local network 1022 and communication interface 1020. In accord with the invention, one such downloaded application program comprises computer executable program code for performing the method of authenticating data related to on-line transactions described herein.

The received code may be executed by CPU 1013 as it is received, and/or stored in mass storage 1012, or other non-volatile storage for later execution. In this manner, computer 1000 may obtain application code in the form of a carrier wave.

The computer systems described above are for purposes of example only. An embodiment of the invention may be implemented in any type of computer system or programming or processing environment or any other kind of communications access device.

Thus, a method and apparatus for authenticating data related to on-line transactions has been presented. Although the present invention has been described with respect to certain example embodiments, it will be apparent to those skilled in the art that the present invention is not limited to these specific embodiments. Further, although the operation of certain embodiments has been described in detail using certain detailed process steps, some of the steps may be omitted or other similar steps may be substituted without departing from the scope of the invention. Other embodiments incorporating the inventive features of the present invention will be apparent to those skilled in the art. The invention is defined by the claims and their full scope of equivalents.

SECTION A

Java Wallet User Interface Functionality

INDEX

Introduction

This document is an overview of Java Wallet functionality from the user interface perspective. It is for JavaSoft™ customers: the licensees, developers and distributors of Java-based software technologies who need to provide secure, authenticated monetary, credit and other transactions on the Internet as well as other distributed network environments. The focus is specifically on the Java Wallet, version 1.0, (henceforth, referred to as the Wallet) as one type of user interface for the Java Electronic Commerce Framework™ (JECF) [1] and its associated elements: the Java Commerce APIS, cassettes, one or more databases [2], strong cryptography and a trusted path to the user. This document addresses what end users might want in terms of Wallet and electronic commerce transaction functionality in order to support and propagate secure electronic commerce and other types of secure transactions. This document does NOT address specific user interface implementations by JavaSoft™ customers.

What is a Java Wallet?

The Wallet is a user interface built upon the JECF, a client-side software architecture for secure electronic commerce and sensitive data transactions. The Wallet user interface is part of a Java-based software application with interaction controls as well as user input and information display areas that allow online purchases, value transfers and administrative functions. When activated for use, the Wallet resides independently on top of World Wide Web browsers as well as computer-based desktop operating environments, such as Windows.

Developers can extend the Wallet's functionality by creating "cassettes" [3], digitally signed applets that implement payment protocols and other capabilities. Cassettes are based on a foundation of:

Operations; e.g., purchasing

Protocols; i.e., procedures, such as pay

Instruments; e.g., a credit card

Cassettes will allow JavaSoft™ customers to easily and rapidly develop customized Wallets and other types of network-based transaction and promotional capabilities that require:

an open architecture extensibility easy integration uncompromisable security and authenticity The current products in the marketplace that call themselves "wallets" are not built on a framework architecture and could be encapsulated as a "cassette" in a Java Wallet.

To provide a high degree of security and protection against tampering, the Wallet is currently designed to reside locally on a user's machine and support one Wallet per machine. Multiple users of a machine; e.g., a multi-person household, can be accommodated by individual databases within the context of a single Wallet. With a Wallet configured with their own credit cards and other transaction instruments, users can transfer monetary value or valuable information as well as pay for products and services over the Internet with the feeling of security and trust.

Who provides Wallets ?

The Wallet will NOT be sold or distributed directly to end users by JavaSoft™. It will be licensed by JavaSoft to independent software developers, Internet service providers, and financial institutions, such as banks, credit card and other companies that want to provide secure, authenticated consumer and business-to-business transaction services with the Java "write once, run anywhere" capability behind it. JavaSoft™ will provide these enabling technologies in the form of the Java Commerce Developer's Kit 1.0 (JCDK), which will include sample code, Wallet development and user interface guidelines, as well as the APIs and other software technologies needed to build Wallets. This kit will also allow Wallet developers and distributors to integrate their branding, co-branding and promotional schemes.

How do I get a Wallet?

How does a user get a Wallet? The Wallet will be distributed to end users in ways that will be determined by strategy of the individual providers. The most direct way would be online over the Internet; i.e., via a simple "plug 'n pay" download mechanism built into browsers and applications. In this way, a Java Wallet can be downloaded from a variety of Web locations, including online services, financial and investment institution sites as well as the Java Commerce site. For deeper penetration, it is anticipated that Wallets will also be distributed by floppy disk through direct marketing means. Downloading from a merchant site during a transaction is the least desirable way of getting a Wallet. Albeit, consumers without Wallets should be made aware of the Java Wallet at points of purchase.

When a user chooses to download and install a Wallet, the underlying framework checks whether they already have one installed. If they do, they are asked if they want to update their existing Wallet by setting up a new user in their existing Wallet without having to download anything. When a Wallet is downloaded, it and its associated data will initially reside on a user's local storage device[1] to ensure the highest degree of available security. A Wallet consists of:

a framework for enabling payment instruments and other types of "cassettes"

a framework for security and authenticity; e.g., a trusted path from a merchant to the user the Wallet database [2]

a Wallet launch function integrated into the user's browser and/or computer desktop in the form of an icon and/or menu choice. This launch function will allow users to access their Wallets directly when both on and off-line.

[1] Note: On a net computer (NC), "local storage device" means wherever personal information is stored, such as on a "smart card" or, much less securely, on a network server site.

Minimum Wallet

The initial setup procedure for a functional Wallet requires only the minimum of a Wallet ID; i.e., a text string that takes the form of a label identifying a downloaded Wallet. If the user chooses to do nothing, this text label can be in the form of a default ID from the Wallet provider, such as "My Wells Fargo Wallet". Users, at this point, can choose to personalize their Wallets by entering a new ID, e.g., "Pat's Wallet" or "My Expense Account." The entry of a new ID will replace the default ID from the Wallet provider.

Useful Wallet

Most users, though, will want to make their Wallets as useful and personal as possible; i.e., by:

importing and/or building a base of their own "Ship to:" addresses and value transfer destinations adding transaction instruments, such as credit, debit, e-cash, and affinity cards, etc.

adding/accepting coupons in addition to other types of incentives and rewards setting Wallet preferences, such as security, transaction defaults, etc.

entering personal profile information, such as, shoe size, travel preferences, etc.

A useful Wallet setup also allows users to enter their personal information, such as name, address, telephone number as well as (if relevant) business information, including company, title, business address and phone in addition to department charge numbers, etc. A useful Wallet will allow users to set up instruments based on new or existing accounts. Finally, users can choose to or NOT to set up security for their Wallets.

Loaded Wallet

A loaded Wallet has all the functionality previously mentioned plus any extended functionality and conveniences that Wallet providers might offer users/customers; e.g., if the user downloads a Wallet from the Web site of a bank or other financial services institute at which they already have an established account, they can specify that the Wallet be installed with their personal information which the service provider might already have in their database, such as their name, access codes (PINs), physical address, email address, profile info, etc. This personal information could include savings, checking, credit, loan and investment account information. A loaded Wallet could also contain personalizable utilities, such as a "push"-based stock ticker/watcher, a mortgage or car loan amortization calculator, etc.

Wallet Parts and Functionality

Setting up a Wallet

Once a Wallet is downloaded and installed, an interface should be provided to:

input the users name, address, telephone number (user profile information)

input the Wallet identifier; e.g., My Wallet, Ted's Biz Wallet, etc.

add one or more payment instruments

Note: One pre-approved instrument may be included by the Wallet provider as an incentive for trying out a Wallet.

set up security preferences set up Wallet preferences, such as defaults, Wallet color/texture, etc.

set up certification (if built in by the Wallet provider)

Graphic Representation of a Wallet in a Browser

The Wallet graphic representation, preferably both an icon and menu listing, should be integrated into both a Web browser and computer's desktop environment, and show:

Wallet provider and/or other branding and promotion a text label identifier under icon, such as My Wallet, Ted's Biz Wallet, etc.

Main Wallet

A Wallet should show:

Wallet name or identifier, such as My Wallet, Ted's Biz Wallet, etc. (should be same as icon text label mentioned above)

Wallet provider's name/logo; e.g., Wells Fargo Bank.

graphic representation of currently active payment instrument(s)

merchant's name/logo (as brand display and hyperlink to merchant's home page)

graphic symbol, such as a "Seal of Trust", to represent a network connection with an authentic party, such as a merchant, peer, service provider, etc.

total cost received from merchant, including discounts, sales tax, and shipping/handling (invoice/receipt information)

Note: Merchants need to communicate to consumers about product and service offers that have life cycle/expiration constraints, such as prices, discounts, etc.

functionality to initiate and complete a PAY transaction

PAID stamp to reassure user of a successful transaction and approval of payment way to:

access user's available payment instruments access "Ship to:"/"Transfer to:" addresses/destinations lists access user preferences, such as default instruments, addresses, currencies, etc.

access a transaction log access more detailed invoice information directly navigate to a merchant's shopping basket input a password if security is activated cancel payment process and transaction display a receipt available deals, such as discounts, coupons, etc.

transaction progress indicator in conjunction with text feedback message capability merchant accountability information, such as 1-800 number, order number, etc.

user memo input area functionality to exit the Wallet

Paying with a Wallet at a Merchant Site

With the Java Wallet, users on the Internet can purchase goods with any available payment instrument that a particular merchant will accept. Once a users have selected the desired merchandise, they can click on the imbedded Wallet icon to open their Wallets to a default payment instrument and an electronic invoice from the mer-chant that indicates the total amount to be paid. At this point, users can click the PAY button in the Wallet to complete a purchase transaction that is reinforced with a receipt.

The interaction between the Wallet and the merchant is more conversational than linear. Rather than initiated explicitly by the user, much of this conversation, however, occurs behind the scenes in the form of different cassette protocols, "backend" connections, security and authentication protocols, etc. When the user arrives at a Wallet-aware merchant site, the site can query the user's Wallet about the user's name, address, affiliations, etc. The user has control via preferences over how much information (if any) may be given to each merchant depending on factors, such as what level of trust has or can be established. The merchant uses this information to automatically fill in shipping information, state sales tax, etc.

Another kind of interaction concerns coupons, vouchers, and discounts. The merchant may be able to make offers based on what the users have in their Wallets. When the Wallet is open, the user should be able to specify different combinations of payment mechanisms and see how the price is affected. This requires a conversational linkage between the Wallet and merchant.

It has been shown in recent usability studies that users want a strong interactive relationship between their Wallets and the places where or people with whom they are conducting electronic transactions. For example in a payment transaction, the "Ship To" and "Bill To" fields of the Web site where commerce is being conducted should display the same filled-in information that users have set up in their Wallets. Because the Wallet "floats" as an electronic appliance on top of the Web site and feels disconnected from it, this visual relationship of the same information appearing identically in both places helps reinforce and tighten this relationship built on software mechanisms invisible to the user.

For a more detailed scenario see Section Appendix B: A Simple Scenario—Paying with a Java Wallet.

Pre-authorized Payments

The Wallet allows the user to pre-approve payments or transactions with specific merchants or service providers as well as with certain instruments. These transactions would be typically done in increments metered by value or time; e.g., playing an online arcade game at 40 airline miles per each 15 minutes of play with the constraint set at one hour of play. These transactions would be based on increments that are not practically handled or aggregated by certain instruments or instrument providers.

The status meter is the user interface that continually apprises the user of value or time remaining to spend from a pre-authorized payment. The transaction meter should have different display states that can be set according to the interaction context. These states are:
  not displayed; e.g, when the user does not want the meter to cover any part of a game play or other interaction/information display area
  minimnum display; e.g, when the user wants to constantly watch the meter states but wants minimum coverage of the interaction/information display area.
  full display; e.g, when the user wants to add value or time, change instruments, set defaults, etc. and needs the full Wallet interface.

This pre-authorized meter interface would have the following parts and functionality:

Pre-authorized Payment Meter
  The minimum meter window shows:
  current total amount spent
  starting balance of value or time
  cost per increment of time
  transaction elapsed value/time status bar
  way to:
    stop transaction
    navigate meter display states; i.e., not displayed, minimum display, full display
    exit the meter
    access more detailed transaction information
  The full meter window shows the minimum meter attached to a full Wallet interface and shows:
  way to:
    lock/unlock meter (prevent any action until password is entered again)
    set/modify spending/time limits.
    add value or time to current balance
Note: For the remainder of the full functionality including, modifying a Wallet, setting preferences, transaction log, see section, Wallet Parts and Functionality, above.

Online Value Transfers

The Wallet can also allow online transfers of value from one person's payment instrument to some repository destination, such as another person's physical payment instrument (smart card) or account that is specified by the user. This transfer interface could be an integral part of a multi-functional Wallet or exist as an independent interface associated with physical or virtual instruments dedicated to anonymous cash transfer type of use, such as with the use of a physical Mondex Card.

Note: There is an effort afoot in the industry to allow these types of transfers to be anonymous if a user so desires, similar to physical transfers of cash from one person to another.

This online value transfer part of the Wallet interface should have functionality providing the following ways to:
  input a numeric value to be transferred
  select another instrument
  input or select a destination
  start transfer process
  stop transfer process
  exit the Wallet
  lock/unlock Wallet
  lock/unlock card (physical card)
  add/delete value
  change instruments
  add, delete, or modify destinations (url addresses and aliases)
  select different currencies (cassette functionality)
  select a desired currency rate (cassette functionality)
Note: For the remainder of the full functionality including, modifying a Wallet, setting preferences, transaction log, see section, Wallet Parts and Functionality, above.

Wallet Administrative Functions

The user can perform administrative functions any time the Wallet is open—either during a payment or transfer transaction. In the latter case, the user is not necessarily online or conducting a transaction. Each of these functions may bring up its own dialog, display area in Wallet, or mode.

Modifying a Wallet
  The Wallet should provide a way to:
  select and activate another instrument, such as a coupon, in addition to the currently active one
  select and activate another instrument replacing currently active one
  add/delete instruments
  organize payment instruments
  add, delete, or modify "Ship To"/"Transfer To" name and address information
  change preference settings
  add, delete, or modify user profile information
  lock/unlock Wallet; i.e., prevent any interaction until a password is entered Upgrade Wallet Install new versions of a Wallet, new or revised graphics, new cassettes, new database of recognized affiliations, etc.

Add/modify Wallet IDs

The user can change an existing Wallet ID and create new Wallet IDs (e.g., My Business, Wife's Wallet, etc.).

General instrument administration

There is a mode in which payment, discount, service and other types of instruments can be added, sorted/filtered, grouped, or deleted. Each instrument should have its own individual administrative functions defined by the instrument "cassette" provider.

Note: More about instruments in a separate section, Payment and Discount Instruments, below.

Addresses

Addresses can be used for product fulfillment shipping and value transfer destinations. These addresses can be selected for use from an address book style database. Addresses can be added, deleted, or modified. Each address record can be labeled as desired by the user; e.g., "Home," "Work," "Aunt Madge's", in which case, only the label needs to be shown on the main Wallet display. A label in link form can provide quick access to a complete address record in the form of editable fields for modification purposes.

Transaction log

The transaction log contains all information about each transaction. These transactions are recorded to the log automatically. The log should have at least two levels of information display. The top level lists basic transaction information: type of transaction, amount paid/transferred, date/time, receiver of payment/value transfer, type of instrument, transaction ID, class, etc. But each item also can be opened to show the details and terms of the transaction, including a receipt for each completed transaction. The user can sort and filter the log by different criteria, including date/time, "Completed"/"Pending" transactions, etc. Users should be able to manipulate the transaction log, such as print or fax it. To preserve its integrity, users should NOT be allowed to edit the transaction log EXCEPT to delete line items of outdated or no longer needed transactions. If users attempt to delete a transaction, they should be queried via a confirmation dialog whether they actually intend to delete it or not.

In the case of pending transactions, the user can review interrupted transactions or those in progress, and then cancel or continue them according to desire. A confirmation dialog query is displayed to the user if the transaction is canceled and payment not made.

The Transaction Log shows the following:
completed and pending transactions
graphic representation of merchant or transaction type
transaction type (credit, debit, cash, coupon, etc.)
total transaction value
indication of transaction status; e.g., "Completed", "Pending", expiration information, etc.
indication of type of currency; e.g., US$, BPS, ITL, SFR, DM, FF, YEN, etc.
transaction time/date stamp from merchant
transaction ID (merchant order number, transaction code, etc.)
transaction class; e.g., Personal, Business, etc.
sorting functionality (by date/time, type, class, value, currency, etc.)
way to access more detailed transaction information (or, link back to merchant)
transaction status (indicating paid, pending or failed transaction)
product or service name (from SKU codes, etc.)???
date/time
transaction type
class of transaction
transaction value total amount
currency type Preferences The user should be able to set preferences as a way to personalize their Wallets as well as "cassettes" contained within the Wallet framework. Preferences could include the following:
security levels and password management
points of security; e.g., in order to open Wallet, to wake up a sleeping wallet, to use an instrument to make a payment or value transfer, etc.
set Wallet-level spending/value transfer limits
Wallet sleep or time-out thresholds
what personal data (e.g., name, address, etc.) to provide to merchants
Wallet defaults (instrument, address/destination, receiver of value to be transferred, etc.
preferred certificates and authentication
Wallet ID and ownership information
set cassette preferences, such as cassette-level spending/value transfer limits, security, etc.
transaction log display preferences
modes of Help and user assistance
setting defaults, such as payment instrument, "Ship To" address, currency type, display preferences, etc.

Security

Security should be set up in the Preferences part of the Wallet. Users may elect to have no security for their Wallet. In this case, a "No Security" setting should be available. Both the Wallet and its accompanying instruments can have security gateways that provide entry via the input of a password. The password that provides access to the Wallet should be set up in the Preferences part with the typical double entry of a new password to confirm correct entry. Instruments and other types of "cassettes" may have different gateways and security setups depending on the design of the "cassette" provider; e.g., an ATM card cassette may have a 4-digit PIN security setup that is compatible with the user's physical ATM card. From a human factors point of view, a recommended design goal would be: the fewer different passwords or PINs that users have to memorize or write down, obviously, the better.

Payment and Discount Instruments

Technically, all instruments are a similar kind of thing in terms of their software construct, the "cassette". Conceptually, credit cards, discount coupons, affinity cards, etc. are perceived as different things by users. Discount mechanisms should be presented differently from payment instruments. Users should be able to set up their own categories by which to group them.

The initial installation and setup of instruments takes place in one of two ways: manual or automatic.

Manual installation

In the case of an existing card, account or membership, users go to the Wallet's instrument installation/setup mode and choose from a list of instruments that the Wallet knows, or enters its name. They enter their account or membership number (if applicable) and other information. The Wallet provides a generic image, which incorporates the user's name and any other useful information.

Automatic installation

New instruments can be downloaded online or distributed on disk; in each case they install themselves automatically. In the case of a credit card or membership instrument that the user downloads from a site that already has their account data, the user shouldn't have to enter anything (though they need an option to change it). In other cases, they may be prompted for additional information.

For all instruments, the cardholder or member name (if any) defaults to the user's name, but can be edited (to allow for variations, spouse's name, etc.). There should be a user-defined string associated with each card that is shown as part of its name or image, so the user can differentiate between, for example, personal and business credit cards from the same provider. Instruments should also include a way to get to the provider's (or relevant merchant's) site via a clickable url or button of some sort.

The main categories of instruments are:

Credit and debit cards

Users can add their existing physical credit and debit cards to the Wallet by entering their account numbers and any other required identifying information (such as a social security number) then downloading them from provider sites. They may also be able to apply for and install new cards online based on a particular provider's approval and authorization protocol.

E-cash

Users can store electronic cash in their Wallets, or can use their Wallets to buy more e-cash with a credit or debit cards. Users can also receive e-cash from others in a relatively anonymous way.

Smart cards

Smart cards are different from other electronic payment instruments mentioned in this document in that they are physical cards and require a card reader device integrated internally or connected externally to their computers. Because of the physical nature of smart cards and their reader devices, the installation, setup, maintenance and access procedures will have some different requirements at the system, browser and Wallet levels primarily having to do with hardware interfacing protocols and their manifestations in the Wallet interface.

As well as being physical, smart cards are more ephemeral than other instruments. These cards can not only be used up but can be thrown out, bent, mangled, lost, or misplaced. They can also wear out and may need to be replaced. The way smart cards are shown in the Wallet needs to take into account both their electronic and physical states.

Discounts and memberships

Although affinity and membership relationships are very different from merchant discount coupons and vouchers in terms of how they present promotions and consumer incentives, the Wallet regards them as the same, since the main reason for any of them is the discount or deal they provide, or the way they affect an electronic transaction. Users should be able to group and categorize them in whatever way they desire.

Some of the forms that of discount and coupon deals might take are:

"10% off for members of AARP"

"Buy 10 CDs and get one free"

"Get 500 frequent flier miles if you buy your tickets online"

"5 widgets for $1 if you buy them this week"

"Buy version 1.0 before June 1, get the upgrade free when it comes out in August"

"30 minutes free service with coupon"

Discount and coupon instruments may need to show a larger amount of information than other payment instruments, including the terms of the coupon or discount, items to which it applies, expiration date, etc. (in addition to standard information such as the provider or merchant's name and logo, and the user's name or member number, if applicable).

Design Considerations

Trust and Security

Reinforcing the feelings of trust, authenticity and security should be primary in all aspects of the Wallet's design, including its "look and feel", the wording of its messages, and the information that appears in primary or secondary displays of information. Trust can be reinforced by the relationship mentioned above (see Interaction Between Wallet and Merchant) between the users' Wallets and the places online where they are engaged in transactions or value transfers.

It has been shown through the previously mentioned user studies that trust and authenticity can be reinforced by symbols of trust that are displayed strategically in the Wallet interface. Symbols of trust, though, have to be backed by a history of credibility and integrity that comes via successful use, endorsement by trusted, respected industry and government leaders, and other reinforcements.

Different display platforms

The current version 1.0 of the Wallet has been designed for PC and workstation style of display and interaction platforms with various types of keyboards and mice as the primary input mechanisms. In the future, no assumptions should be made about what input devices Wallet users may have available to them. They may range from touch panels to pen-based gesture devices to voice recognition input. Wallets may ultimately be available on variety of devices ranging from PDAs to cellular phones to public-access terminals.

Disabling Instruments

Payment/discount instruments not accepted by the seller should be disabled. Disabled instruments should appear to be grayed out so that the user doesn't think that they have been lost or inadvertently deleted by the Wallet.

Branding and promotion

There can be four levels of branding and promotion in the Wallet:

Level 1: the Wallet graphic frame as well as the icon on the browser and desktop that represents the Wallet can be branded by the Wallet provider.

Level 2: the invoice area of the Wallet can support branding and promotion presentations for both merchants or service providers.

Level 3: instruments (cards) can have graphics, animation, sound, buttons, etc. as defined by their providers. JavaSoft should provide guidelines for their basic size, shape and behavior.

Level 4: a Wallet billboard area that can be defined by the Wallet provider.

Redundancy in the Interface

The users of Java Wallets will have different skill levels and experiences with computers and distributed network environments. In response to this, a design goal should be to provide more than one way to perform many of the functions, e.g., access to functionality both through icons in a Web site, a browser, on the Desktop as well as via menu lists.

Double-clicking should never be the only way to do something, as it is difficult for many people as well as cumbersome on touch-screens and pen-based gesture interfaces. In voice recognition interfaces, supposedly double "clucking" is effective. Triple clicking, which has crept into some contemporary interfaces, should never be included in the interaction model.

Future extensibilty

The Wallet is just the first piece of a larger electronic commerce system. The Java Electronic Commerce FrameworkTm is meant to evolve to ultimately support the breadth and depth of asset management both from a business-to-business as well as personal perspective. The Wallet metaphor is also meant to evolve and be extended to include online banking, investments, billing, bartering, contract negotiation, etc.

SECTIONS

Section A: User scenario: Setting up a Wallet

Jo is shopping for the first time on the Internet, and finds some videotapes that she wants to buy for her nephew while browsing The Disney Store. Of the various methods of payment offered, the Wells Fargo Java Wallet is the only secure payment mechanism provided. Jo, recently read an article in both the Wall Street journal Online and Consumer Reports about how secure Java-based Wallets are compared to the other available methods.

After selecting the videos she wants to purchase, Jo clicks on the Java Wallet icon that appears in the Disney electronic shopping cart page. Since Jo doesn't currently have a Wallet, a dialog appears asking her if she wants to get one. She indicates 'YES' and a page appears in the Disney site with information describing a Java Wallet as well as this hyperlink, "Get a secure Wells Fargo online Java Wallet containing your VISA™ card or Mastercard™ now." After clicking the hyperlink, a simple form appears to allow Jo to supply her full cardholder name, account number and expiration date of an existing credit card she would like to use. Once the credit card info is verified, Jo is prompted to input her User Name then enter and re-enter an up to an 8-character alphanumeric password. Finally, Jo is given a brief explanation of the Seal of Trust and is prompted to type in a unique alphanumeric Code of Trust that will appear on the Seal of Trust graphic, when the Wallet is open in a trusted, authenticated commercial or private Web site.

After entering then reentering the Code of Trust, Jo clicks the "Return to Shopping" button that causes the Disney shopping cart to re-appear with a Wallet overlaid. The Wallet displays an invoice indicating the total cost of the videos. The invoice is accompanied by Disney branding graphics as well as a 1-800 Customer Service number. The Seal of Trust with Jo's unique alphanumeric Code of Trust appears at the bottom of Jo's Wallet to ensure Jo that the Disney site is authentic and trusted. A Wells Fargo VISA™ card graphic is displayed to represent the payment instrument. Underneath the card image is a text label, "Wells Fargo Bank VISA™," the account Jo has chosen to use. Jo opens up the "Ship To:" tabbed area by clicking on it then fills in the "Ship To:" editable fields with her nephew's shipping information. She then adds this information to her Wallet address book.

Jo, satisfied that she has completely filled in the required information, clicks the PAY button. An elapsed time indicator appears to communicate the states of the transaction. When the transaction is successfully complete, a confirmation message and a receipt with a transaction identity code and other information appears. Finally, the receipt is stamped with "PAID." For further assurance though, Jo opens the transaction log to see if her first transaction is listed—and it is.

Section B: A Simple Scenario—Paying with a Java Wallet

The following is a walk-through of a Web-based purchase transaction, including what the user does and what the Wallet shows at each point.

Assumptions:

a Web browser that supports Java Wallet APIs the user has only one Java Wallet installed on his machine.

The Scene:

The user is browsing a merchant Web site, such as The Disney Store, with the goal of making a purchase.

User: Selects desired items and designates them to go into the merchant shopping basket Display: Highlights to reinforce user action User: Navigates to shopping basket.

Display: Shows view of shopping basket; i.e., a list of products, including quantity, item code number, description of item, unit cost, extended cost User: Selects items to purchase and inputs quantity for each item.

Display: View of product list with updated quantities and extended prices

User: Chooses Java Wallet as the PAY mechanism by either clicking on the Wallet icon in the browser or the same icon imbedded in the merchant page.

Note: The Wallet could be one of several competing payment alternatives available)

Display: The Wallet security dialog appears.

User: Selects a User ID from a selectable list, inputs an up to eight character password then clicks the OK button.

Note: The minimum Wallet ID selection list is two items, one Wallet ID and New ID.

Display: The Wallet then appears.

The following are other Wallet functions that could be used in the above transaction scenario:

1. The simplest Wallet payment transaction occurs when the user simply activates payment (clicks the PAY button) and starts the transaction without changing any of the default selections or preferences. After activating a payment, the Wallet shows network connection and payment process status. The Wallet indicates when a payment transaction is successfully completed via a graphic indicator.

If for some reason a payment transaction cannot be completed, a user friendly message provides the user with a graceful way to deal with the situation. A user friendly message could be any useful, plain language information about the cause and possible resolution of the problem, including a 1-800 telephone number.

2. The user can opt to select then change payment and discount instruments. Only those instruments accepted by the receiver of payment should be available. The user's other payment instruments are disabled (low lighted). The user should be able to get information, such as the available balance on a particular payment instrument. An example of extended functionality would be that the user might be able to get information on more than one discount payment instrument at one time to compare the differences.

3. The user can attempt to cancel a transaction while it is in progress. A message should be displayed by the Wallet indicating that the transaction has been canceled and offering choices of possible action to the user.

4. While the Wallet is displayed, the user can perform any of the administrative functions outlined below (modify Wallet, change preferences, etc.). Any changes should be graphically reflected in the Wallet.

5. A Wallet does NOT automatically disappear when a transaction is completed unless the user explicitly exits it or navigates to another site, where the user's current Wallet context is not relevant. If users close or exit their Wallets in the process of a pay or value transfer transaction, they are queried via a dialog message about the nature of their intent. When the Wallet is closed, the user returns to the location and state they were in before opening their Wallet.

Section C: Wallet Functionality

Initially, the Java Wallet developers kit will provide the capability for a basic set of functionality, which will include the following:

Getting a Wallet
What users can do:
download a Wallet
fill in Wallet owner /"Ship to:" information (name, address, daytime phone, etc.)
add the first as well as subsequent payment instruments (card)
set up Wallet security
set up Addresses
input alphanumeric unique identifier (e.g., Code of Trust) for authentication interface (e.g., Seal of Trust)
What providers can do:
provide Wallets with customized or customizable "look and feel"
provide Wallets with customized cassettes, such as a personal, ubiquitous shopping basket
provide easy, pre-authorized "add instrument" set up capabilities
mask download latency Wallet transaction interfaces
What users can do:
pay for products and services
make pre-authorized incremental payments (e.g.; time-metered payments)
transfer value peer-to-peer
view branding and promotional information
get incentives and discount offers
save receipts as files and print/fax them
What providers can do:
display branding and promotional information
offer incentives and discounts; such as airline miles rewards, coupons, etc.
provide extra-value additions, such as, stock ticker/watcher, mortgage calculator, etc.
mask transaction latencies (e.g., via animation, form fill, building-style information display, etc.)
provide authenticity and trust reinforcement, via a graphic symbol and/or animation, etc.
provide international currency selection and currency exchange data
provide users an organizational structure for:
coupons and other incentives
addresses/transfer destinations
instruments
What merchants can do:
display branding and promotional information
provide coupons and other incentives
provide authenticity encoding
provide signed offers and trustable invoice information
provide accountability information, such as, 1-800 number, transaction ID, etc.

Maintaining a Wallet
What users can do:
add and delete payment instruments (cards)
add, change (where permissible), sort/filtering and delete addresses ("Ship To"/"Transfer To" addresses)
set up and change preferences
change Wallet security
What providers can do:
automatically update Wallet "look and feel" and user interface functionality in-place
automatically update Wallet encryption and security infrastructure
automatically update "cassette" functionality enhancements/improvements
extend database handling and data management with their own solutions
provide users with an organizational structure for:
coupons and other incentives
addresses/transfer destinations
instruments Recording and monitoring transaction information (transaction log)
What users can do:
access log
delete a transaction line item
sort and filter log
get more detailed transaction information
What providers can do:
automatically add transaction record to log
implement framework for data sorting/filtering
What merchants can do:
provide accountability and other information, such as, 1-800 number, transaction ID, etc.

References

1. Java Electronic Commerce Framework Architectural Overview:
http://www.javasoft.com:80/products/commerce/jecf_arch.html
2. Wallet Database
http://www.javasoft.com:80/products/commerce/jecf_arch_db.html
3. Cassettes
http://www.javasoft.com:80/products/commerce/jecf_arch_[TBD].html

SECTION B

Seal of Trust Display Procedure

Introduction

The Java Seal of Trust and its accompanying alphanumeric Code of Trust is a visual indicator to the user of a Java Wallet that all of the content displayed in the Wallet is trusted and authentic, including but not limited to electronic payment instruments as well as merchant branding, invoice and receipt data, etc.

This content is comprised of instruments, operations and protocols. A Java Wallet is an user interface to the Java Electronic Commerce Framework (JECF) that allows users to make secure purchases and value transactions via distributed network environments. The JECF is a software architecture primarily comprised of Java signed applets known as "cassettes". These cassettes are digitally signed using strong public key cryptography.

The procedure to display the Seal of Trust:

1. The user opens a Java Wallet by invoking a Pay or other Openwallet event.

2. As a result, the Purchase Cassette (an operation cassette), the primary Java signed applet that controls a Java Wallet, is opened.

3. the Security Manager (a primary component of the JECF) checks the Purchase Cassette to see if, in fact, it is truly signed 4. if the Purchase Cassette is signed by a trusted signer: 
the Wallet displays the TRUSTED Seal of Trust overlaid with the alphanumeric Code of Trust to indicate that all the cassettes in the Wallet are trusted. if the Purchase Cassette is NOT signed (i.e.; it is not authenticated): 
the Wallet displays the UNTRUSTED Seal of Trust as a warning. The Code of Trust cannot be displayed.

Notes:

1. A list of trusted signers is contained in the Wallet database, which resides locally in the file system of the user's machine.

2. When a Pay action is initiated by the user, cassettes are loaded in the following order:

2.1 Wallet UI Cassette is loaded 2.2 Purchase Cassette is loaded 2.3 Protocol, Instrument and Service Cassettes are loaded in an order determined by the Wallet design 3. The Code of Trust is an alphanumeric ASCII text string similar to a password string that is set up by users when they set up their Java Wallet preferences.

4. All operations in the JECF are initiated with a Java Commerce Message. A Java Commerce Message (JCM) is basically a Properties file. For example, the JCM for a purchase looks a lot like an invoice.

5. A purchase will start with a selection on a merchant site. This selection will cause a JCM to be sent to the client machine, where the JECF will be launched as a helper application. The JECF will recognize that the JCM is requesting a purchase and in turn will launch the Java Wallet.

I claim:

1. A method for authenticating data relating to an on-line transaction engaged in by a user using a communications access device, comprising the steps of:

determining the authenticity of said data;

outputting a certification indicator comprising a plurality of media components via said communications access device in an order defined by said user if said data is determined to be authentic.

2. A method for authenticating data relating to an on-line transaction engaged in by a user using a communications access device, comprising the steps of:

determining the authenticity of said data;

outputting a certification indicator via said communications access device when said data is determined to be authentic where said certification indicator is in the form of an audio output of said communications access device.

3. A article of manufacture comprising:

a computer processor usable medium having computer processor readable program code embodied therein for authenticating data related to an on-line transaction engaged in by a user using a communications access device, said communications access device comprising said computer processor, said computer processor readable program code in said article of manufacture comprising:

computer processor readable program code configured to cause said communications access device to determine the authenticity of said data;

computer processor readable program code configured to cause said communications access device to output a certification indicator comprising at least one user defined component, said user defined component comprising an order of outputting a plurality of media components when said data is determined to be authentic.

4. An article of manufacture comprising:

a computer processor usable medium having computer processor readable program code embodied therein for authenticating data related to an on-line transaction engaged in by a user using a communications access device, said communications access device comprising said computer processor, said computer processor readable program code in said article of manufacture comprising:

computer processor readable program code configured to cause said communications access device to determine the authenticity of said data;

computer processor readable program code configured to cause said communications access device to output a certification indicator to said user via an audio output of said communications access device when said data is determined to be authentic.

5. A communications access device for electronically engaging in an on-line transaction comprising:

a computer processor;

an output device;

a computer processor usable medium having computer processor readable program code embodied therein for authenticating data related to an on-line transaction engaged in by a user using said communications access device, said computer processor readable program code comprising:

computer processor readable program code configured to cause said communications access device to determine the authenticity of said data;

computer processor readable program code configured to cause said communications access device to output a certification indicator comprising a plurality of media components using said output device in an order defined by said user when said data is determined to be authentic.

6. A communications access device for electronically engaging in an on-line transaction comprising:

a computer processor;

an output device;

a computer processor usable medium having computer processor readable program code embodied therein for authenticating data related to an on-line transaction engaged in by a user using said communications access device, said computer processor readable program code comprising:

computer processor readable program code configured to cause said communications access device to determine the authenticity of said data;

computer processor readable program code configured to cause said communications access device to output a certification indicator comprising at least one user defined component to said user via an audio output device when said data is determined to be authentic.

7. A computer data signal embodied in a carrier wave and representing sequences of instructions which, when executed by a processor of a communications access device, cause said processor to authenticate data related to an on-line transaction engaged in by a user, by performing the steps of:

determining the authenticity of said data;

outputting a certification indicator, via said communications access device, to said user in an order defined by said user when said data is determined to be authentic.

8. A computer data signal embodied in a carrier wave and representing sequences of instructions which, when executed by a processor of a communications access device, cause said processor to authenticate data related to an on-line transaction engaged in by a user, by performing the steps of:

determining the authenticity of said data;

outputting a certification indicator to said user via an audio output of said communications access device when said data is determined to be authentic.

* * * * *

UNITED STATES PATENT AND TRADEMARK OFFICE
CERTIFICATE OF CORRECTION

PATENT NO.    : 6,018,724
DATED         : January 25, 2000
INVENTOR(S)   : Michael A. Arent It is certified that error appears in the above-identified patent and that said Letters Patent is hereby corrected as shown below:

Title page,
Assignee "Sun Micorsystems, Inc." should read -- Sun Microsystems, Inc. --

Signed and Sealed this

Twenty-fifth Day of December, 2001

Attest:

Attesting Officer

JAMES E. ROGAN
Director of the United States Patent and Trademark Office